US00RE46690E

(19) United States
(12) Reissued Patent
Oliver et al.

(10) Patent Number: US RE46,690 E
(45) Date of Reissued Patent: Jan. 30, 2018

(54) METHOD AND SYSTEM OF SPLITTING AND MERGING INFORMATION SPACES

(71) Applicant: Nokia Technologies Oy, Espoo (FI)

(72) Inventors: Ian Justin Oliver, Soederkulla (FI); Sergey Boldyrev, Soederkulla (FI); Sergey Balandin, Helsinki (FI)

(73) Assignee: Nokia Technologies Oy, Espoo (FI)

(21) Appl. No.: 14/271,954

(22) Filed: May 7, 2014

Related U.S. Patent Documents

Reissue of:
(64) Patent No.: 8,346,814
Issued: Jan. 1, 2013
Appl. No.: 12/474,576
Filed: May 29, 2009

(51) Int. Cl.
*G06F 17/30* (2006.01)

(52) U.S. Cl.
CPC .. *G06F 17/30486* (2013.01); *G06F 17/30958* (2013.01)

(58) Field of Classification Search
None
See application file for complete search history.

(56) References Cited

U.S. PATENT DOCUMENTS 6,556,983 B1 4/2003 Altschuler et al.
6,633,886 B1 * 10/2003 Chong ..... 707/798
6,751,619 B1 6/2004 Rowstron et al.
6,996,625 B2 * 2/2006 Kaplan ..... G06F 9/542 707/999.004
7,209,923 B1 4/2007 Cooper
8,346,814 B2 * 1/2013 Oliver ..... G06F 17/30958 707/798
8,458,229 B2 * 6/2013 Oliver ..... G06F 17/30958 707/802
8,799,177 B1 * 8/2014 Saiprasad ..... G06Q 50/01 705/319
2002/0129175 A1 * 9/2002 Banavar et al. ..... 709/310
2004/0111410 A1 6/2004 Burgoon et al.
2004/0210552 A1 * 10/2004 Friedman ..... G06F 17/30864 707/999.001
2006/0037019 A1 * 2/2006 Austin et al. ..... 718/100
2008/0147584 A1 * 6/2008 Buss ..... 706/47
2009/0024615 A1 * 1/2009 Pedro ..... G06F 19/324 707/999.005
2009/0063516 A1 3/2009 Wang et al.
2009/0234832 A1 9/2009 Gao et al.
2009/0254574 A1 * 10/2009 De ..... G06F 17/30734 707/999.1
2009/0259652 A1 * 10/2009 Yamane ..... G06F 17/30598 707/999.003
2009/0287991 A1 * 11/2009 Nakamura et al. ..... 715/210
(Continued)

FOREIGN PATENT DOCUMENTS

EP 1 973 053 A1 9/2008

OTHER PUBLICATIONS

Grosof, B.N. "Representing E-Commerce Rules Via Situated Courteous Logic Programs in RuleML", Electronic Commerce Research and Applications, Sep. 29, 2003.*
(Continued)

*Primary Examiner* — Luke S Wassum
(74) *Attorney, Agent, or Firm* — Alston & Bird LLP

(57) ABSTRACT

An approach is provided for managing split and merge operations for information spaces with respect to their information content.

22 Claims, 10 Drawing Sheets

(56) References Cited

U.S. PATENT DOCUMENTS

| | | | | |
|---|---|---|---|---|
| 2009/0313331 | A1* | 12/2009 | Rasmussen et al. | G06F 17/2288 709/205 |
| 2010/0030725 | A1* | 2/2010 | Mendis | G06F 21/6227 707/781 |
| 2010/0063953 | A1* | 3/2010 | Kumar | 706/50 |
| 2010/0241698 | A1* | 9/2010 | Hillerbrand | H04L 12/24 709/203 |
| 2010/0318558 | A1* | 12/2010 | Boothroyd | 707/769 |
| 2011/0047169 | A1* | 2/2011 | Leighton | G06F 17/30675 707/756 |
| 2011/0314075 | A1* | 12/2011 | Boldyrev | G06F 9/5066 709/201 |

OTHER PUBLICATIONS

Hayes, P. ed. "RDF Semantics: W3C Recommendation", downloaded from www.w3.org/TR/2004/REC-rdf-mt-20040210/, Feb. 10, 2004.* de Bruijn, J., F. Martin-Recuerda, D. Manov, and M. Ehrig "D4.2.1 State-of-the-art Survey on Ontology Merging and Aligning V1", EU-IST Integrated Project (IP) IST-2003-506826 SEKT, Jul. 22, 2004.*

Ding, L., T. Finin, Y. Peng, P. Pinheiro da Silva, and D.L. McGuinness "Tracking RDF Graph Provenance Using RDF Molecules", Technical Report TR-CS-05-06, UMBC, Apr. 30, 2005.*

Petrovic, M., H. Liu, and H-A. Jacobsen "G-ToPSS: Fast Filtering of Graph-based Metadata", Proceedings of the 2005 World Wide Web Conference, May 10-14, 2005.*

Vdovják, R. "A Model-driven Approach for Building Distributed Ontology-based Web Applications", ISBN 90-386-0584-6, 2005.*

Li, J., H. Boley, V.C. Bhavsar, and J. Mei "Expert Finding for eCollaboration Using FOAF with RuleML Rules", Proceedings of the Montreal Conference on eTechnologies (MCTECH), May 2006, pp. 53-65.*

Muñoz, S., J. Perez, and C. Gutierrez "Minimal Deductive Systems for RDF", Proceedings of the 4th European Conference on the Semantic Web: Research & Applications (ESWC '07), Jan. 2007, pp. 53-67.*

Chatterjee, N. and M. Krishna "Semantic Integration of Heterogeneous Databases on the Web", Proceedings of the International Conference on Computing: Theory and Applications (ICCTA '07), Mar. 5-7, 2007, pp. 325-329.*

Polleres, A. "From SPARQL to Rules (and back)", Proceedings of the 2007 World Wide Web Conference, May 8-12, 2007, pp. 787-796.*

Nixon, L.J.B., E. Simperl, R. Krummenacher, and F. Martin-Recuerda "Tuplespace-based Computing for the Semantic Web: A Survey of the State-of-the-art", The Knowledge Engineering Review, vol. 23:2, Jun. 2008, pp. 181-212.*

Ramakrishna Soma, V.K. Prasanna, "Parallel Inferencing for OWL Knowledge Bases", 37th International Conference on Parallel Processing (ICPP), 2008, pp. 75-82, doi:10.1109/ICPP.2008.64.*

Oliver, I., J. Honkola, and J. Ziegler "Dynamic, Localised Space Based Semantic Webs", Proceedings of the IADIS International Conference WWW/Internet, Oct. 13-15, 2008, pp. 426-431.*

Braatz, B. and C. Brandt "Graph Transformations for the Resource Description Framework", Proceedings of the 7th International Workshop on Graph Transformation and Visual Modeling Techniques (GT-VMT 2008), 2008.*

Hosain, S. and H. Jamil "Empowering OWL with Overriding Inheritance, Conflict Resolution and Non-monotonic Reasoning", Proceedings of the AAAI Spring Symposium, Mar. 23-25, 2009, pp. 53-58.*

Yan, Y., C. Wang, A. Zhou, W. Qian, L. Ma, and Y. Pan "Efficient Indices Using Graph Partitioning in RDF Triple Stores", Proceedings of the 25th IEEE International Conference on Data Engineering (ICDE '09), Mar. 29-Apr. 2, 2009, pp. 1263-1266.*

Oliver, I. "Information Spaces as a Basis for Personalising the Semantic Web", Proceedings of the 11th International Conference on Enterprise Information Systems (ICEIS 2009), May 6-10, 2009, pp. 179-184.*

Boldyrev, S., I. Oliver, and S. Balandin "The Process of Split and Merge in Smart Spaces", Proceedings of the XII International Symposium on Problems of Redundancy in Information and Control Systems, May 25-30, 2009, pp. 221-230.*

Oliver, I. and S. Boldyrev "Operations on Spaces of Information", Proceedings of the 2009 IEEE International Conferemce on Semantic Computing, Sep. 14-16, 2009, pp. 267-274.*

Rienstra, T. "Dealing with Uncertainty in the Semantic Web", M.Sc. Thesis, Univerisity of Twente Department of Computer Science, Nov. 8, 2009.*

Nokia Corporation "Written Opinion of the International Searching Authority, International Application PCT/FI2010/050393", May 17, 2010.*

Karypis, G. and V. Kumar "A Fast and High Quality Multilevel Scheme for Partitioning Irregular Graphs", Society for Industrial and Applied Mathematics Journal on Scientific Computing (SISC), vol. 20, No. 1, pp. 359-392, 1998.*

Office Action for Chinese Application No. 201080029944.1 dated Jan. 16, 2015.

Extended European Search Report from corresponding European Patent Application No. 10780103.7 dated Nov. 7, 2016.

Newman A et al.; "Scalable Semantics—The Silver Lining of Cloud Computing"; Escience, 2008; Escience '08 IEEE Fourth International Conference on, IEEE, Piscataway, NJ; Dec. 7, 2008; pp. 111-118.

"Design Rationale of RuleML: A Markup Language for Semantic Web Rules", by Boley et al. IN: Proc. SWWS-2001 (2001). Available at http://teacode.com/biblio/new.d1.pdf Last visted Jan. 25, 2012.

International search report and written opinion for correspoding international application No. PCT/FI2010/050393 dated Sep. 9, 2010, pp. 1-19.

Notice of Allowance for U.S. Appl. No. 12/474,576 dated Aug. 28, 2012.

Office Action for U.S. Appl. No. 12/474,576 dated Jan. 31, 2012.

"Expert Finding for eCollaboration Using FOAF with RuleML Rules," by Li et al. In. Proc. of the 2006 Conf. on eTechnologies (2006). Available at: http://nparc.cisti-icist.nrc.gc.ca/npsi/ctrl?action=rtdoc&an=5203354&lang=en Last visited: Jan. 25, 2012.*

"From SPARQL to Rules (and back)," by Polleres, Axel. In: Proceedings of the 16th international conference on World Wide Web, pp. 787-796 (2007). Available at: ACM.*

"G-ToPSS: Fast Filtering of Graph-based Metadata," by Petrovic et al. In. Proceedings of the 14th international conference on World Wide Web, pp. 539-547 (2005). Available at: ACM.*

Efficient Indices using Graph Partitioning in RDF Triple Stores, Yan et al., IEEE International Conference on Data Engineering, Mar. 29, 2009, pp. 1263-1266.

Operations on Space of Information, Oliver et al., Proceedings of the IEEE International Conference on Semantic Computing, Sep. 14, 2009, pp. 267-274.

Parallel Inferencing for OWL Knowledge Bases, Soma et al., 37th International Conference on Parallel Processing, Sep. 9, 2008, pp. 75-82.

The processes of split and merge in smart spaces, Boldyrev et al.,XII International Symposium on Problems of Redundancy in Information and Control Systems, May 26-30, 2009, pp. 221-230.

Tracking RDF Graph Provenance using RDF Molecules, Ding et al., Proceedings of the Fourth International Semantic Web Conference, 2005, pp. 1-14.

* cited by examiner

100

300A

300B

500A

500B

700

METHOD AND SYSTEM OF SPLITTING AND MERGING INFORMATION SPACES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This is achieved through numerous, individual and personal spaces in which persons, groups of persons, etc. can place, share, interact and manipulate webs of information with their own locally agreed semantics without necessarily conforming to an unobtainable, global whole. These information spaces, often referred to as smart spaces, are projections of the 'Giant Global Graph' in which one can apply semantics and reasoning at a local level.

Each smart space entity can be considered as an aggregated information set from different sources. This multi-sourcing consideration is very flexible since it accounts that the same piece of information can come from different sources. Information is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc.

In an information space, information requested by a user may be distributed over several information sets and therefore in order to deduce an accurate answer to a request there is the need for combining (merging) the information from different sources into a smart space. Furthermore, due to several reasons such as security issues, changing agreements and so on, it could be necessary for an information space to be split into two or more smaller spaces. The process of splitting one space may be volatile, meaning that merging the split spaces together again may not produce the initial space, since some links between information could be lost. Conventionally, there is no strict order to justify "split-merge" or "merge-split" procedures. The process involves high volatility in terms of which split spaces can be merged and which solid spaces (merged earlier) can be split without damaging the initial contents.

SOME EXEMPLARY EMBODIMENTS

Therefore, there is a need for efficient logical mechanisms for splitting and merging of information spaces taking into account semantic agreement processes and providing solutions for history management of smart spaces.

According to one embodiment, a method comprises retrieving an information space that is represented by a graph; and receiving a request to split the information space into a first new information space and a second new information space, wherein the first new information space is represented by a first sub-graph and the second new information space is represented by a second sub-graph. The method also comprises determining one or more broken links of the graph; identifying one or more nodes of the graph that are to be grounded; grounding the graph based on the identified nodes; and creating a first set of rules for the first new information space and a second set of rules for the second new information space using rules for the information space. Further, the method comprises defining a first boundary for the first new information space and a second boundary for the second new information space along the broken links; and updating history of the first new information space and history of the second new information space based on the respective boundaries.

According to one embodiment, computer-readable storage medium carrying one or more sequences of one or more instructions which, when executed by one or more processors, cause an apparatus to perform at least the following: retrieving an information space that is represented by a graph; receiving a request to split the information space into a first new information space and a second new information space, wherein the first new information space is represented by a first sub-graph and the second new information space is represented by a second sub-graph; determining one or more broken links of the graph; identifying one or more nodes of the graph that are to be grounded; grounding the graph based on the identified nodes; creating a first set of rules for the first new information space and a second set of rules for the second new information space using rules for the information space; defining a first boundary for the first new information space and a second boundary for the second new information space along the broken links; and updating history of the first new information space and history of the second new information space based on the respective boundaries.

According to another embodiment, an apparatus comprises at least one processor; and at least one memory including computer program code, the at least one memory and the computer program code configured to, with the at least one processor, cause the apparatus to perform at least the following: retrieve an information space that is represented by a graph; and receive a request to split the information space into a first new information space and a second new information space, wherein the first new information space is represented by a first sub-graph and the second new information space is represented by a second sub-graph. The apparatus is further caused to determine one or more broken links of the graph; identifying one or more nodes of the graph that are to be grounded; ground the graph based on the identified nodes; and create a first set of rules for the first new information space and a second set of rules for the second new information space using rules for the information space. Also, the apparatus is further caused to define a first boundary for the first new information space and a second boundary for the second new information space along the broken links; and update history of the first new information space and history of the second new information space based on the respective boundaries.

According to another embodiment, an apparatus comprises means for retrieving an information space that is represented by a graph; and means for receiving a request to split the information space into a first new information space and a second new information space, wherein the first new information space is represented by a first sub-graph and the second new information space is represented by a second sub-graph. The apparatus also comprises determining one or more broken links of the graph; means for identifying one or more nodes of the graph that are to be grounded; means for grounding the graph based on the identified nodes; and means for creating a first set of rules for the first new information space and a second set of rules for the second new information space using rules for the information space. Further, the apparatus comprises means for defining a first boundary for the first new information space and a second boundary for the second new information space along the broken links; and means for updating history of the first new information space and history of the second new information space based on the respective boundaries.

According to another embodiment, a method comprises retrieving a plurality of information spaces that are represented, respectively, by a plurality of graphs; receiving a request to merge the information spaces into a new information space; unifying the graphs and associated histories to create a new graph; unifying histories of the information spaces for the new information space; removing portions of histories that each of the information spaces holds about other ones of the information spaces; retrieving rules corresponding to the information spaces; and generating a resultant set of rules for the new information space based on resolving inconsistencies of the retrieved rules.

According to one embodiment, computer-readable storage medium carrying one or more sequences of one or more instructions which, when executed by one or more processors, cause an apparatus to perform at least the following: receiving a request to merge the information spaces into a new information space; unifying the graphs and associated histories to create a new graph; unifying histories of the information spaces for the new information space; removing portions of histories that each of the information spaces holds about other ones of the information spaces; retrieving rules corresponding to the information spaces; and generating a resultant set of rules for the new information space based on resolving inconsistencies of the retrieved rules.

According to another embodiment, an apparatus comprises at least one processor; and at least one memory including computer program code, the at least one memory and the computer program code configured to, with the at least one processor, cause the apparatus to perform at least the following: retrieve a plurality of information spaces that are represented, respectively, by a plurality of graphs; receive a request to merge the information spaces into a new information space; unify the graphs and associated histories to create a new graph; unify histories of the information spaces for the new information space; remove portions of histories that each of the information spaces holds about other ones of the information spaces; retrieve rules corresponding to the information spaces; and generating a resultant set of rules for the new information space based on resolving inconsistencies of the retrieved rules.

According to yet another embodiment, an apparatus comprises means for retrieving a plurality of information spaces that are represented, respectively, by a plurality of graphs; means for receiving a request to merge the information spaces into a new information space; means for unifying the graphs and associated histories to create a new graph; means for unifying histories of the information spaces for the new information space; means for removing portions of histories that each of the information spaces holds about other ones of the information spaces; means for retrieving rules corresponding to the information spaces; and means for generating a resultant set of rules for the new information space based on resolving inconsistencies of the retrieved rules.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method, apparatus, and software are provided for splitting and merging information spaces in an information system. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
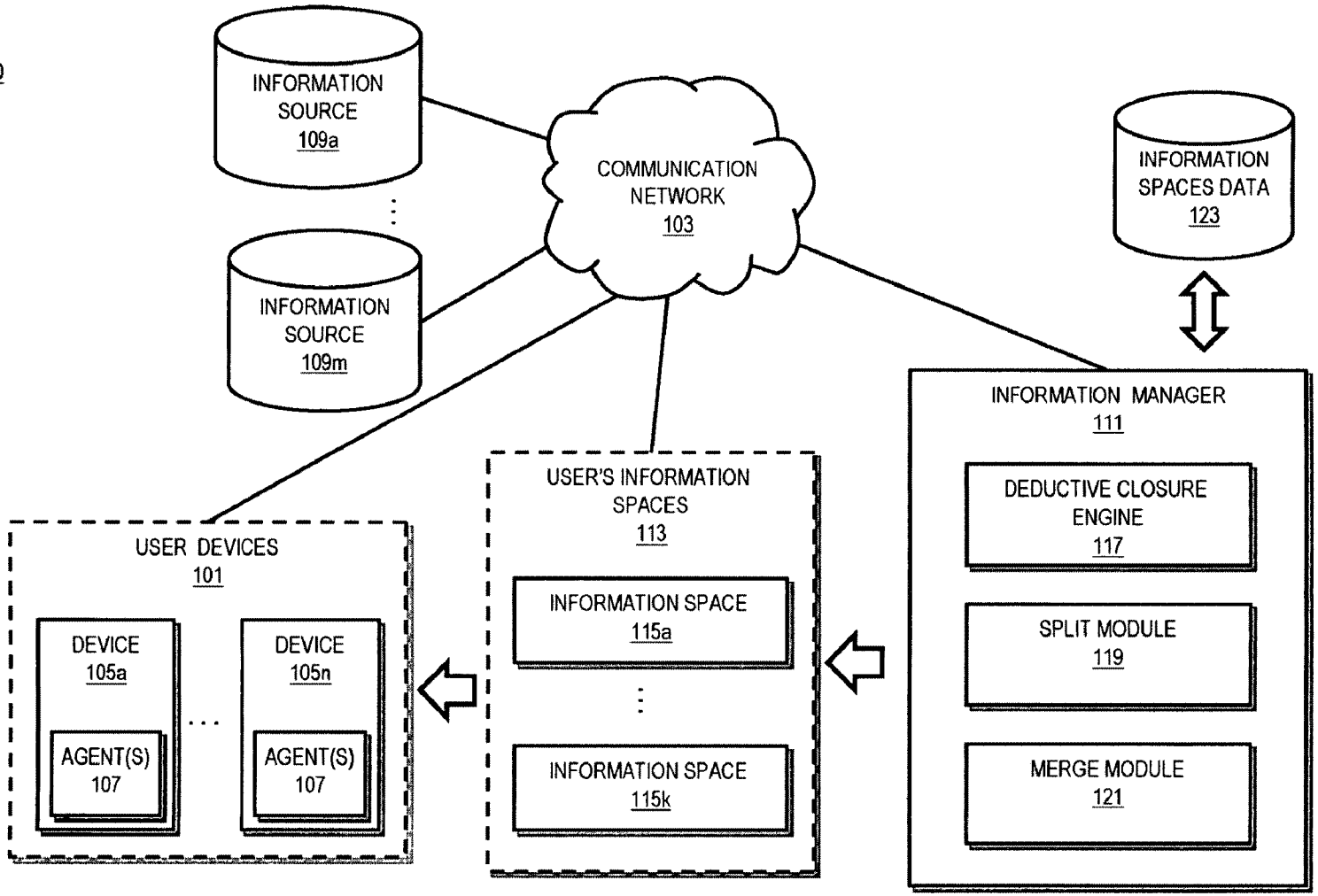
FIGS. 1A-1C are diagrams, respectively, of an information system capable of providing "split" and "merge" operations on information spaces, and flowcharts of the "split" and "merge" operations, according to various embodiments.
Figure 1B:
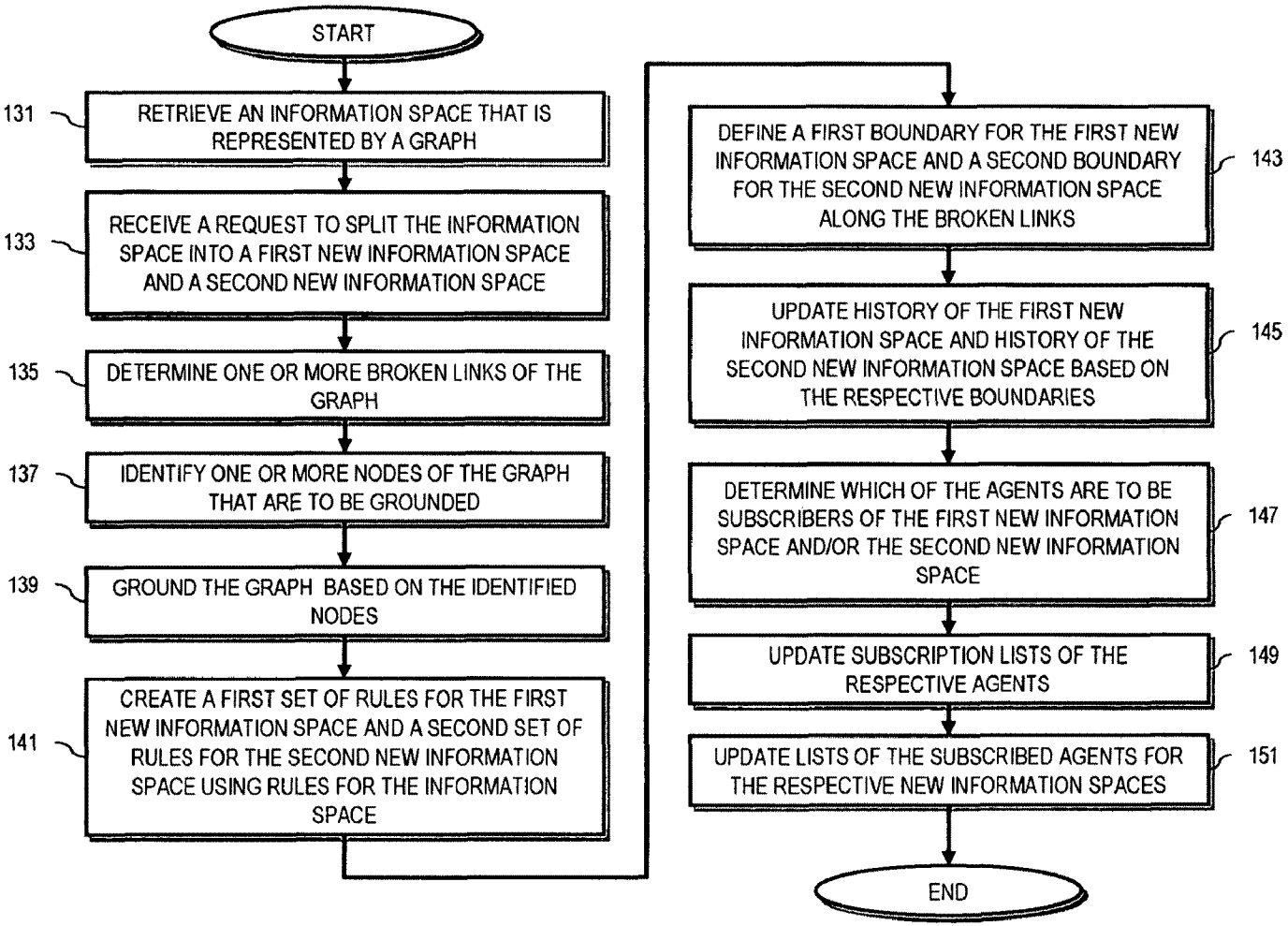
Figure 1C:
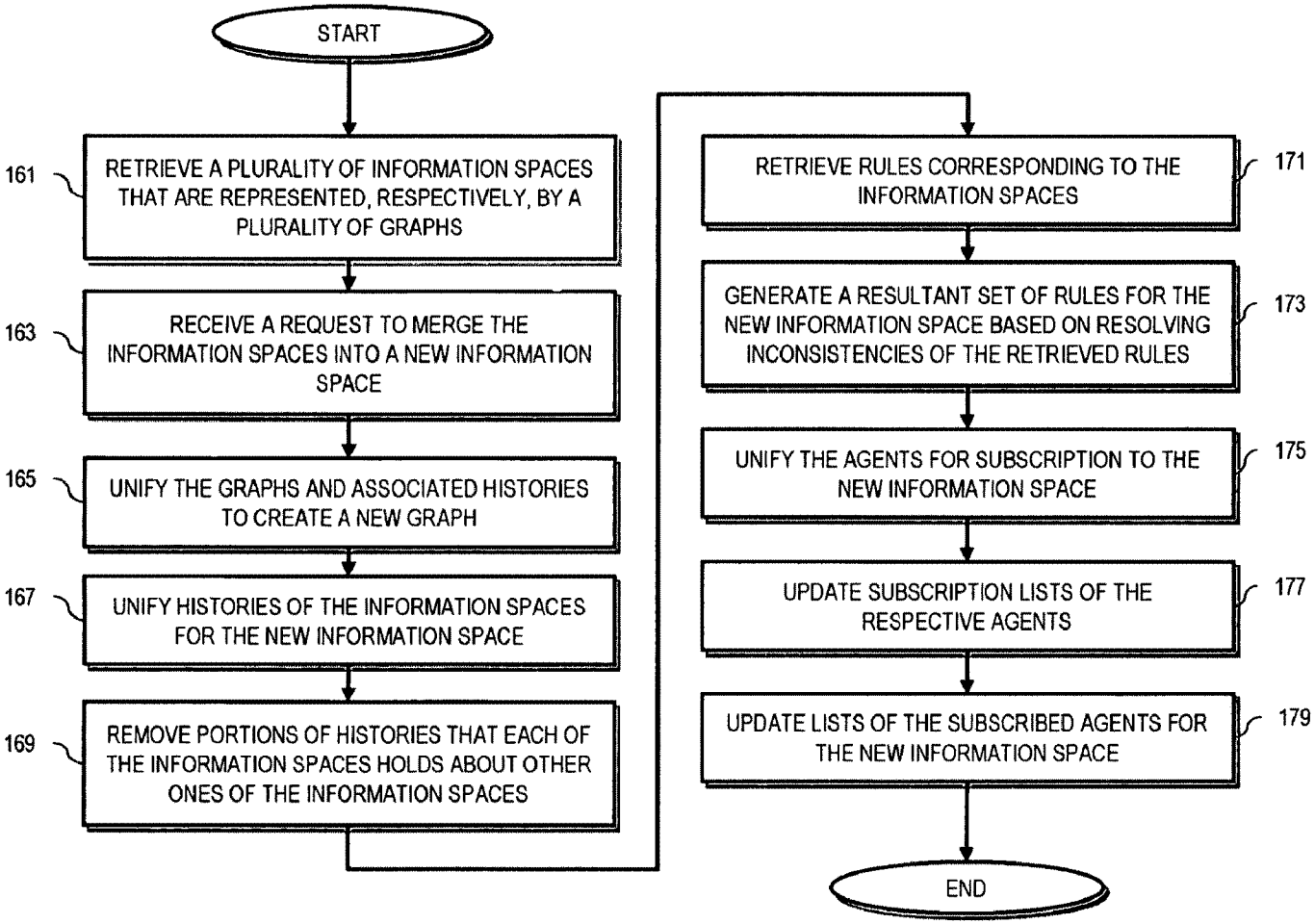

FIGS. 1A-1C are diagrams, respectively, of an information system capable of providing "split" and "merge" operations on information spaces, and flowcharts of the "split" and "merge" operations, according to various embodiments. As shown in FIG. 1A system 100 comprises a set 101 of user devices communicating through a communication network 103. The communication network 103 may include one or more information sources 109a-109m that could be physically apart in distant locations from each other but accessible by user devices 101 through the communication network 103. Each user has one or more sets of information extracted from information resources 109a-109m by information manager 111 based on users requirements (queries). Information manager 111 stores user's requested information in user specific information spaces 113 and manages and maintains those spaces.

According to one embodiment, a space is defined as a triple (G, H, ρ) where G is a graph of information nominally conforming to, for example, Resource Description Framework (RDF) semantics, the space history H, is a set of graphs of information also conforming to RDF semantics and ρ is a set of rules used to calculate the deductive closure of G under queries.

Two basic operations "creation" and "deletion" are defined on a space. The creation operation receives a name n, initial graph of information G (which might be empty) and a set of rules ρ to produce the space:

$$\text{createspace}(n, G, \rho)\ (G, \emptyset, \rho)_n$$

A new space does not have a history and therefore the history set H is an empty set. The deletion operation receives a space n and removes all its information producing an empty set:

$$\text{deletespace}(n) \rightarrow \emptyset$$

Other operations for "inserting" and "removal" of information in an existing space are defined as follows:

$$\text{insert}(n, g) \rightarrow (G_n \cup g, H_n, \rho_n)_n$$

$$\text{remove}(n, g) \rightarrow (G_n - g, H_n, \rho_n)_n$$

where g is a graph of information expressed using RDF semantics.

Querying an information space is made via a query q and the graph returned as a result is the sub-graph of G under deductive closure that conforms to q:

$$\text{query}(n, q) \rightarrow \Delta(G_n, \rho_n) \models q$$

where Δ is the deductive closure mechanism.

The given operations can be composed together to form more complex operations such as "update". The update of information in a space can be expressed as the combination of remove and insert. However, if the intersection of inserted sub-graph and removed sub-graph is not empty, the order in which insert and remove are applied will affect the operation result. For example, given a graph containing a single element {a}, the operation to insert a graph {b} and then immediately remove the graph {b} as an atomic operation results in the graph {a} where if the ordering of insertion and removal is reversed, the graph {a b} is obtained. Therefore, update operation as defined below, returns a valid result only if the intersection of inserted and deleted sub-graphs is empty:

$$\text{update}(n, g_i, g_r) \rightarrow \begin{cases} \text{remove}(n, g_r); \text{insert}(n, g_i): & g_i \cap g_r = \varphi \\ \perp: & g_i \cap g_r \neq \varphi \end{cases}$$

Agents are independently executed, autonomous entities that interact with spaces without explicit coordination. Once an agent is created, it may perform any operation that it is authorized to perform on spaces. An agent is uniquely identified by a name and contains a set of all the spaces to which it has joined. That is, an agent is a one-tuple (S) where S is the said set of spaces. Creation and deletion of agents is similar to that of spaces:

$$\text{createagent}(a) \rightarrow (\emptyset)_a$$

$$\text{deleteagent}(a) \rightarrow \emptyset_a$$

where a is the name of the agent.

A definition of space is extended to contain a set of known and thus joined agents: (G, H, ρ, A) where A is the set of agents.

An agent a may join and leave a space n. The join operation is defined as follows:

$$\text{join}(a, n) \rightarrow \begin{cases} a \in A_n \wedge n \in S_a: & a \notin A_n \wedge n \notin S_a \\ \text{fail}: & a \notin A_n \wedge n \in S_a \\ \text{fail}: & a \in A_n \wedge n \notin S_a \\ \text{pass}: & a \in A_n \wedge n \in S_a \end{cases}$$

The above definition implies that when an agent a joins a space n, space n is added to the list of spaces that a has joined, and agent a is added to the list of agents for space n. The "fail" results are related to exceptional conditions where agent's knowledge about its known spaces is different from the space's knowledge of that particular agent and vice versa. The "pass" result relates to the condition where an agent is trying to join an already joined space.

The leave operation is defined as follows:

$$\text{leave}(a, n) \rightarrow \begin{cases} \text{pass}: & a \notin A_n \wedge n \notin S_a \\ \text{fail}: & a \notin A_n \wedge n \in S_a \\ \text{fail}: & a \in A_n \wedge n \notin S_a \\ a \in A_n \wedge n \in S_a: & a \in A_n \wedge n \in S_a \end{cases}$$

Leave operation is analogous to join. The leave process involves removing agent and space from each other's lists.

The notions of join and leave operations imply that the basic and composite operations on a space must take into consideration the agent performing the task and whether it is known to the space.

The definition of a space is further extended to include a mechanism by which entities known as agents can subscribe to changing information within spaces. This requires additions to the definitions of agent and space to allow the recording of these subscriptions. The definition of a space is now extended as (G, H, ρ, A, U) and an agent is now defined as (S, U) where in both cases U is the said set of active subscriptions.

In one embodiment, a subscription is a persistent query over the given space that when the space detects a change in the contents of the space, if the results of the query have changed since the last time the query was run then the changed results are returned. These results could potentially be filtered to return just the changed part of the information in some implementations. An agent may request and terminate subscriptions in the following manner $$\text{subscribe}(a, n, q\#) \rightarrow \begin{cases} q\# \in U_a \wedge q\# \in U_n: & q\# \notin U_a \wedge q\# \notin U_n \\ \text{fail}: & q\# \in U_a \vee q\# \in U_n \end{cases}$$

$$\textit{un}\text{subscribe}(a, n, q\#) \rightarrow \begin{cases} q\# \notin U_a \wedge q\# \notin U_n: & q\# \in U_a \wedge q\# \in U_n \\ \text{fail}: & q\# \notin U_a \vee q\# \notin U_n \end{cases}$$

Information spaces are represented using Resource Description Framework (RDF). RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph.

TABLE 1

| Subject | Predicate | Object |
|---|---|---|
| uri:// . . . /rule#CD-introduction, | rdf:type, | uri:// . . . /Rule |
| uri:// . . . /rule#CD-introduction, | uri:// . . . / rule#assumption, | "c" |

RDF graphs can be combined in a unified graph as well as decomposed into their constituent sub-graph. However, in order to avoid information loss, the logical relations between graph nodes need to be preserved during the process or the nodes need to be functionally grounded. The presence of Blank Nodes (BNodes) complicates RDF graph decomposition since BNodes do not come with universally unique identifiers. A BNode is a node that is not a URI reference or a literal. In the RDF abstract syntax, a BNode is just a unique node that can be used in one or more RDF statements, but has no intrinsic name. BNodes from different RDF graphs are assumed different by default; however there is no way to recognize whether two BNodes represent the same or different things. Some BNodes could be functionally grounded given a background ontology stating that some properties are instances of web ontology language OWL Inverse Functional Property (IFP) or OWL Functional Property (FP). The definition to build a three-fold categorical partition on RDF nodes can be extended; this is more fully described in Ding et al. in "Tracking RDF Graph Provenance using RDF Molecules" (Technical report, 2005, Proceedings of the Fourth International Semantic Web Conference, 2005); which is incorporated herein by reference in its entirety. First, given an RDF graph G, a node n in G is said naturally grounded (or grounded) if n is in either U or L. Second, given an RDF graph G with background ontology W, a node n in G is said functionally grounded on W if n is in B and either there exist a triple (n, p, o) in G, where p is IFP according to W, and o is either grounded or functionally grounded; or there exist a triple (s, p, n) in G, where p is FP according to W, and s is grounded or functionally grounded. And finally third, given an RDF graph G with background ontology W, a node n in G is said contextually grounded if n is in B and n is not functionally grounded.

As seen in FIG. 1A, user devices 101 can include one or more devices 105a-105n, with each containing a set 107 of one or more agents that collect user's requested information from user's information spaces 115a-115k. Each user information space 115a-115k stores information that is deduced from information sources 109a-109m by information manager 111 through local or global reasoning by deductive closure engine 11 7.

In one embodiment, split module 119 manages and conducts the process of breaking and reconfiguring user's current information spaces into smaller spaces. This process could be done in different manners such as removing all information and creating multiple individual smaller or even empty spaces or making complete copies of current spaces. Merge module 121 manages and conducts the process of binding individual information spaces together to create a larger space. These individual bodies of information may be overlapping in terms of their content. User devices can interact simultaneously with many discrete spaces. In this case the total information available for a given space is the union of the deductive closure over all the individual bodies of information.

In one embodiment, metadata such as users' queries, agents' identification and agents' subscriptions are stored in database 123. The information manager 111 uses this data.

According to one embodiment, a split operation is shown in FIG. 1B. In step 131, the process retrieves an information space that is represented by a graph. For the purposes of explanation, the split operation is explained with respect to partitioning the information into two subspaces (i.e., two subgraphs). The process also receives, as in step 133, a request to split the information space into a first new information space and a second new information space, wherein the first new information space is represented by a first sub-graph and the second new information space is represented by a second sub-graph. Next, in step 135, the process determines one or more broken links of the graph, and identifies one or more nodes of the graph that are to be grounded (step 137). In step 139, the graph is grounded based on the identified nodes. In step 141, the process creates a first set of rules for the first new information space and a second set of rules for the second new information space using rules for the information space. Further, the process defines, per step 143, a first boundary for the first new information space and a second boundary for the second new information space along the broken links, Thereafter, the process updates history of the first new information space and history of the second new information space based on the respective boundaries (step 145).

As mentioned, the information space is subscribed by a multiple agents. In step 147, the process determines which of the agents are to be subscribers of the first new information space and/or the second new information space. Next, the subscription lists of the respective agents are updated (step 149). In step 151, the process updating lists of the subscribed agents for the respective new information spaces.

With respect to the merge operation, this process is described in FIG. 1C. In step 161, the process retrieves multiple information spaces that are represented, respectively, by a graphs. A request is received to merge the information spaces into a new information space; (step 163). In step 165, the process unifies the graphs and associated histories to create a new graph. The process also unifies histories of the graphs for the new information space, per step 167. In step 169, the process removes those portions of histories that each of the graphs holds about other ones of the graphs. In step 171, the process retrieves rules corresponding to the information spaces, and generates a resultant set of rules for the new information space based on resolving inconsistencies of the retrieved rules (step 173). The process, per step 175, unifies the agents for subscription to the new information space. In step 177, the process then updates subscription lists of the respective agents, and updates lists of the subscribed agents for the new information space (step 179).

It is noted that the steps of these processes may be performed in any suitable order, as well as combined or separated in any suitable manner.

The above approaches, in certain embodiments, advantageously provide efficient data processing, while minimizing use of system resources (e.g., bandwidth, and processing). That is, users can issue queries, which can be answered expeditiously because of the management of the information space. In this manner, the user need not expend more resources and effort in locating desired information.

The described approach considers split and merge processes (which are further detailed with respect to FIGS. 3A and 3B) as transitional tasks with main considerations being that of information boundary identification for such a transition. Such boundaries are determined by the depth of the particular information space and rules (if any) applied during the transition period. During each of the processes the most important task is to identify and to guarantee sustained boundaries of the process. Furthermore, every space is capable of storing memories of its own history of transitions. At any point of time it is possible to use history information to extend query results driven from information spaces. It is important to note that boundaries are able to trigger the history to disappear once two or more spaces are merged, and, to produce partially deduced information space along the boundaries over n level depth, where split occurs.

Figure 2:
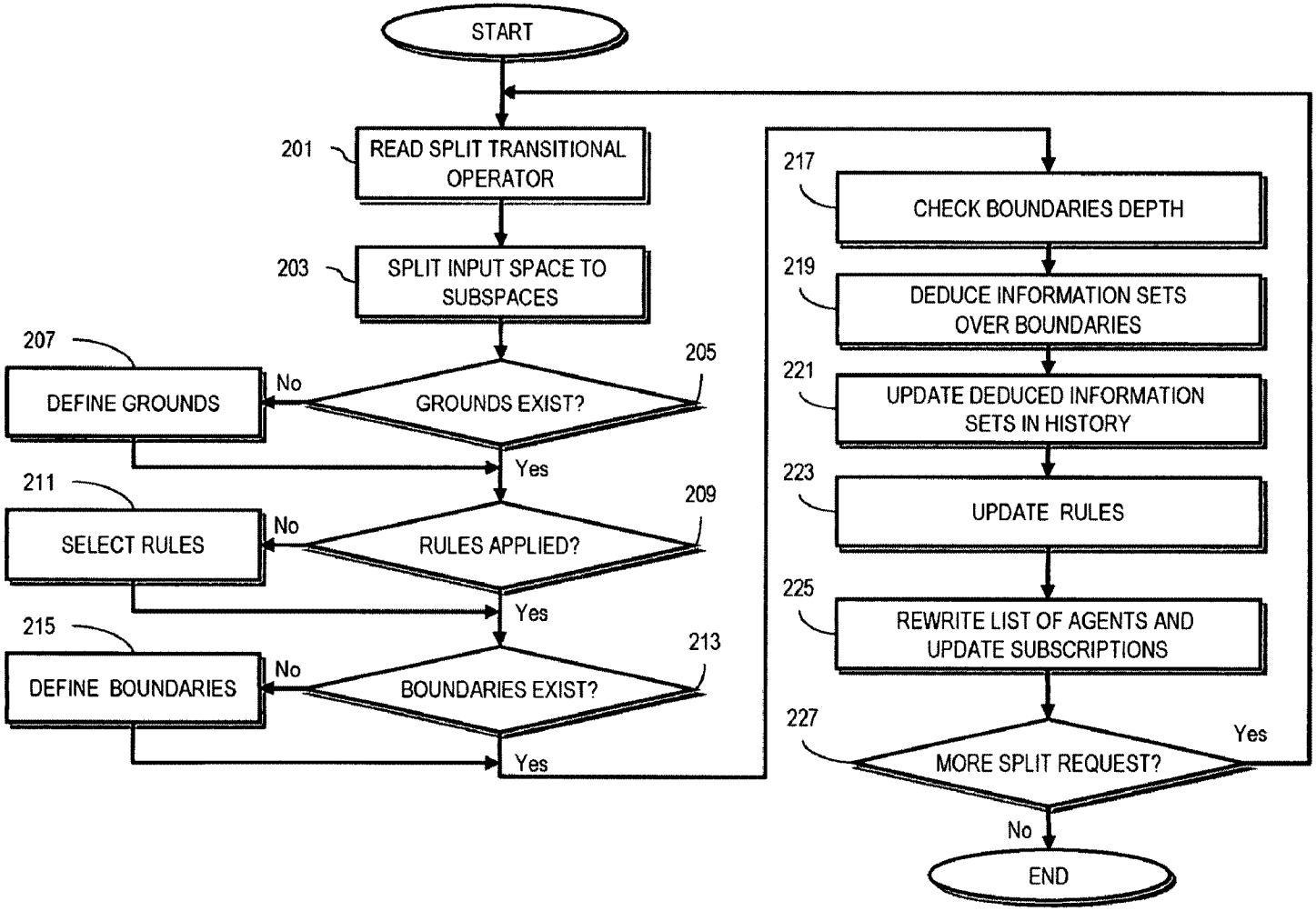
FIG. 2 is a flowchart of an information space split operation, in accordance with one embodiment.
Figure 3A:
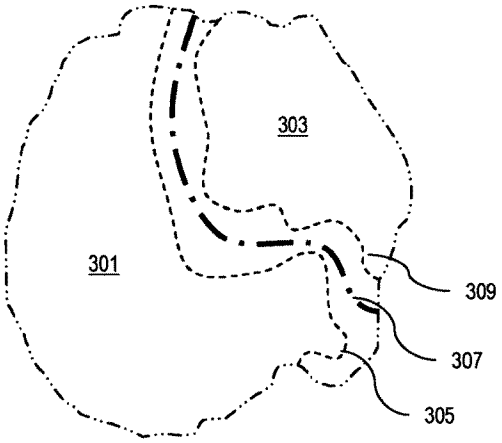
FIG. 3A is a diagram showing splitting of an information space, in accordance with one embodiment.
Figure 3B:
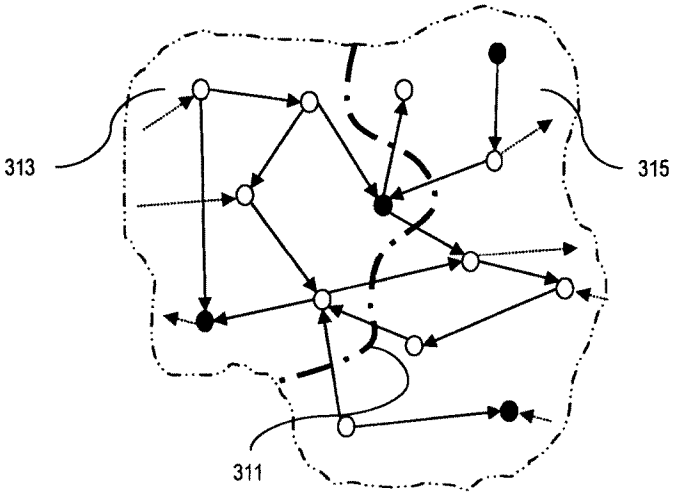
FIG. 3B is a diagram showing splitting of an information graph connected with an information space, in accordance with one embodiment.

FIG. 2 is a flowchart of an information space split operation, in accordance with one embodiment. Here, the process of split operation is described with regards to FIGS. 3A and 3B and formula (1), below. FIG. 3A is a diagram showing splitting of an information space, in accordance with one embodiment; and FIG. 3B is a diagram showing splitting of an information graph connected with an information space, in accordance with one embodiment.

The splitting of a space utilizes, in one embodiment, a number of parameters that define how the space is to be split. FIGS. 2, 3A, 3B and formula (1) represent an exemplary procedure for split operation. The functions described and their processes are exemplary ways of organizing splitting procedure and the process could be organized in many different manners.

$$\text{split}(a, b, n, \phi_a, \phi_b, \delta_a, \delta_b, \beta_a, \beta_b, \alpha_a, \alpha_b) \rightarrow \tag{1}$$
$$\left\{\begin{matrix}(\phi_a(G_n), \beta_a(G_n) \cup H_n, \delta_a(\rho_n), \alpha_a(A_n), U_a)_a, \\ (\phi_b(G_n), \beta_b(G_n) \cup H_n, \delta_b(\rho_n), \alpha_b(A_n), U_b)_b\end{matrix}\right\} \wedge$$
$$\forall \alpha \in \alpha_a(A_n) \cdot S_a[n \backslash a] \wedge \forall \alpha \in \alpha_b(A_n) \cdot S_a[n \backslash b] \wedge$$
$$\forall u \in U_a(A_n) \cdot S_a[n \backslash a] \wedge \forall u \in U_b(A_n) \cdot S_a[n \backslash b]$$

Operation split receives a space n and splits it into two spaces a and b based on the conditions given by functions φ, δ, β and α.

In step 201, the process reads a split transitional operator. Function φ in formula (1) is a query over space n which as per step 203 of FIG. 2 selects a subset of graph G of n for each space a and b. That is, the input space is to be split into subspaces. As the example of FIG. 3A shows the space 300A is divided into spaces 301 and 303 by line 307 and graph 300B of space 300A in FIG. 3B is divided into sub-graphs 313 and 315 by line 311. The fact that where line 307 (311) needs to be drawn and how the space 300A (graph 300B) is to be divided is identified by function φ.

In step 205 of FIG. 2 function β checks whether any arcs of graph 300A have been broken by split process (i.e., whether grounds need to be created). If there are broken arcs, in step 207 function β of formula (1) identifies the nodes that need to be grounded. This is used to control which particular subsets become space a or space b. There is no restriction or relationship governing the splitting into two spaces and the resultant spaces may overlap in terms of content.

In step 209 of FIG. 2 function δ of formula (1) checks whether any deduction rules need to be updated; and in step 211 function δ selects the set of rules that need to be applied.

As per step 213 of FIG. 2 the process, per function β of formula (1), determines whether boundaries exist by checking whether split sub-graphs 313 and 315 in FIG. 3B already have proper boundaries assigned to them; and if this is not the case, in step 215 boundaries are defined. The boundaries are shown in FIG. 3A where line 305 is a boundary for space 303 and line 309 is a boundary for space 301.

In one embodiment, the boundary of a graph 313 of FIG. 3B constitutes those nodes and the related nodes in 315 via the arcs that have been sliced by the split. The minimal boundary is made by taking those nodes and sliced arcs in 315 (as well as those nodes in 313 which have arcs that have been sliced). This minimal boundary is said to be of depth one with respect to nodes in 313. The extent of the boundary is typically one level depth into any of information spaces. Deeper and thus more expansive boundaries can be created n levels (counting by arcs) deep. In any case, one of the three grounding options natural, functional or contextual should be inferred by means of forward chaining rule set and applied. In the best case all three options are inferred. Higher number of completed grounding options guarantees a more sustained information space with less information deterioration, meaning that the bounded information is robust enough to sustain the information of the smart space. This can preserve the ability of smart space to sharpen the information it has, as well as the ability to simplify the traversing of information when searching for a particular fragment. Referring back to FIG. 2 in step 217 boundary depths are checked; and in step 219 new information spaces a and b are deduced over newly defined boundaries.

In step 221 of FIG. 2 results from applying function β are added to the history of split spaces. In step 223, function δ divides the set of rules on space n. This function processes the unification of the set of deductive closure rules. As rule sets, especially those which are non-monotonic in nature, can have conflicts, it is necessary to have a function which orders and potentially removes rules such that the resulting set of rules is 'internally consistent'. This function can induce asymmetry between the spaces in terms of which set of deductive closure rules are used.

As per step 225, function α selects which agents 107 remain as members in each split space, rewrites the list of agents and updates set of agent subscriptions U. Since original space n has been replaced by two new split information spaces a and b, predicates of formula (1) describe that for any agent of space n, n needs to be replace by either a or b in the list of spaces connected to that agent.

If more requests for splitting spaces have been received, step 227 starts the process over from the beginning, otherwise the process ends.

Figure 4:
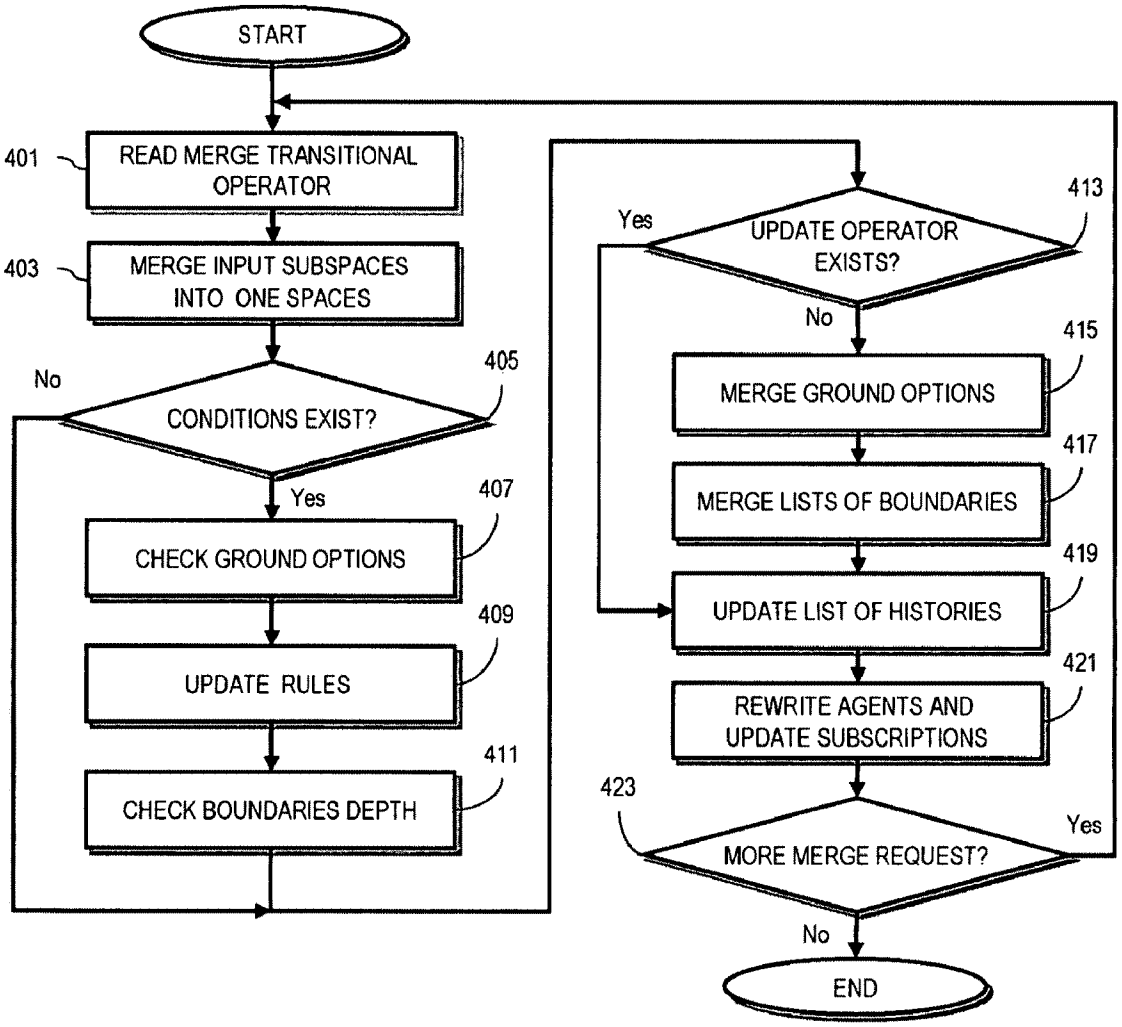
FIG. 4 is a flowchart of an information space merge operation, in accordance with one embodiment.
Figure 5A:
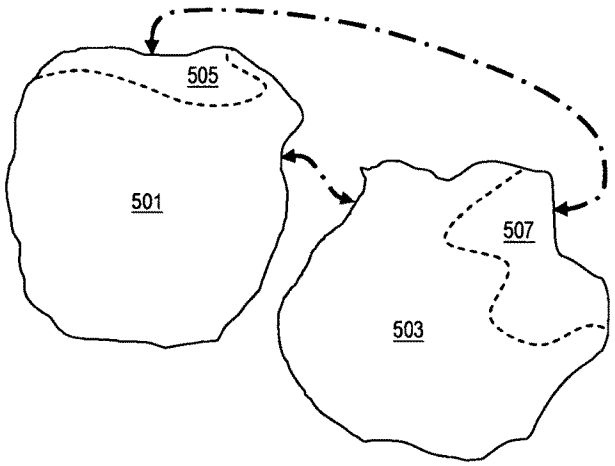
FIG. 5A is a diagram showing merging of two information spaces, in accordance with one embodiment.
Figure 5B:
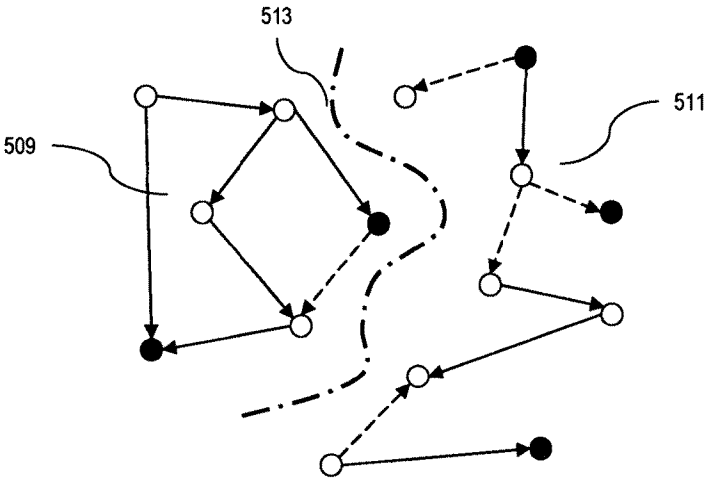
FIG. 5B is a diagram showing merging of two information graphs connected with two information spaces, in accordance with one embodiment.

FIG. 4 is a flowchart of an information space merge operation, in accordance with one embodiment. Here, the process of merge operation is described with respect to FIGS. 5A and 5B and formula (2). FIG. 5A is a diagram showing merging of two information spaces, in accordance with one embodiment and FIG. 5B is a diagram showing merging of two information graphs connected with two information spaces, in accordance with one embodiment. FIGS. 4, 5A, 5B and formula (2) represent an exemplary procedure for merge operation. The functions described and their processes are exemplary ways of organizing merging procedure and the process could be organized in many different manners $$\text{merge}(a, b, n, \gamma, \delta) \rightarrow \tag{2}$$

$$\begin{pmatrix} \gamma(G_a \cup G_b \cup H_a[b] \cup H_b[a]), \\ ((H_a - H_a[b]) \cup (H_b - H_b[a])), \\ \delta(\rho_a, \rho_b), \\ A_a \cup A_b, \\ U_a \cup U_b) \end{pmatrix}_n \wedge \forall \alpha \in A_a \cdot S_a[a\backslash n] \wedge$$

$$\forall \alpha \in A_b \cdot S_a[b\backslash n] \wedge \forall u \in U_a \cdot S_a[a\backslash n] \wedge \forall u \in U_b \cdot S_a[b\backslash n]$$

Operation merge receives two spaces a and b and combines them into one space n based on conditions provided by functions γ and δ.

Function γ in formula (2) is a unification function which calculates relationships between the structures in merged graph $G_n$ of space n. Function δ processes the unification of the rule sets. Since the rule sets, especially those which are non-monotonic in nature can have conflicts, it is necessary to have a function which orders and potentially removes rules so that the resulting rule set is internally consistent. For example, if space a includes a rule as p→q and space b has the rule p→¬ q, merging spaces a and b will result in a conflict between two rules. Function δ is a mechanism for recognizing rule conflicts and deciding which rule has priority over the other based on heuristics.

As the example of FIG. 5A shows, spaces 501 and 503 create space 500A after merge and their related graphs 509 and 511 in FIG. 5B join and create graph 500B. The space n generated by merging spaces a and b is created by simply joining the graphs, histories, rules, agents and subscriptions of spaces a and b. Spaces 501 and 503 are being merged together while areas 505 and 507 have previous history about each other that need to be combined. As seen in formula (2), and per step 403 of FIG. 4, function γ combines graphs $G_a$ (graph 509 of space 501) and $G_b$ (graph 511 of space 503) with the history of space a about b $H_a[b]$ (505) and history of space b about a $H_b[a]$ (507). However, in order to create a history for the merged graph the part of history of space a about b and the part of history of space b about a do not need to be stored anymore. As seen in formula (2) these two parts are deducted from both histories before they are merged.

As per step 405 through 411 function δ checks whether grounding options, rules and boundaries need to be updated. If certain updates on grounding and boundaries are not needed, ground options and boundaries are merged as per steps 415 and 417, otherwise in step 419 histories are updated and in step 421 list of agents and their subscriptions to the new merged space is rewritten.

If more requests for merging spaces have been received, step 423 starts the process over from the beginning, otherwise the process ends.

Based on the descriptions given for split and merge operations, it is noticed that the two operations each could be applied on spaces with history or without history with slightly different processes. If two or more information spaces have no history of being "together", this condition should not prevent them from having any similar information within the spaces. The merging will take all founded boundaries for the transitional process and constructs the n level depth (partially) deduced information spaces over the boundaries. However, if two or more information spaces have some history together, this case can be treated as a combination of merging information spaces with and without history, meaning that the first case discussed above can be involved here when any number of merging information spaces are "not knowing" each other. Besides, there is a process of common history unification and deduction over the merged information space, so that consistency of information can be guaranteed.

Similar discussion can be presented for Split operation. If one information space has no previous history (the very first split), any connection broken by split needs to be grounded with its closest "relative" node. Therefore, a boundary of such split should be identified and n level deep (partially) deduced information space should be created. Furthermore, the history of being in the same information space with other half of the split could be preserved by means of opposing partially deduced information spaces along the boundaries of split. However, if one information space has some history, ungrounded elements should be treated in the same way as in split without history. But additional partially deduced information spaces should be created to preserve any new history elements and thus a set of history elements can be collected (memories being built).

Considering the above discussion, it can be foreseen that once a smart space is requested for some information that it might not have in its own information spaces, the smart space can "look over" the history (memories) and infer that the requested information can be found in some other space(s).

The processes described herein for merging and splitting information spaces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
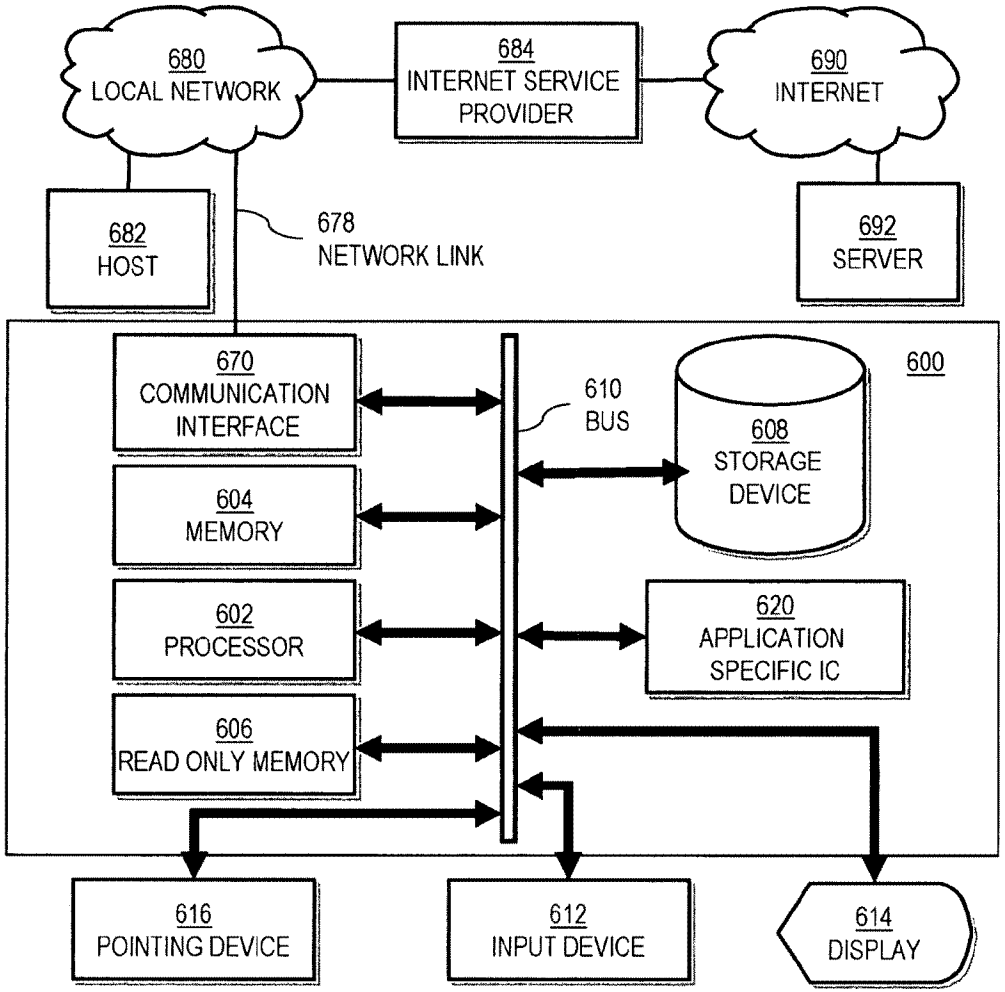
FIG. 6 is a diagram of hardware that can be used to implement an embodiment of the invention.

FIG. 6 illustrates a computer system 600 upon which an embodiment of the invention may be implemented. Computer system 600 includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 610 includes one or more parallel conductors of information so that information is transferred quickly among devices coupled to the bus 610. One or more processors 602 for processing information are coupled with the bus 610.

A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a transmission medium such as a cable or carrier wave, or any other medium from which a computer can read. Information read by a computer from computer-readable media are variations in physical expression of a measurable phenomenon on the computer readable medium. Computer-readable storage medium is a subset of computer-readable medium which excludes transmission media that carry transient man-made signals.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server host 692 connected to the Internet hosts a process that provides a service in response to information received over the Internet. For example, server host 692 hosts a process that provides information representing video data for presentation at display 614.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
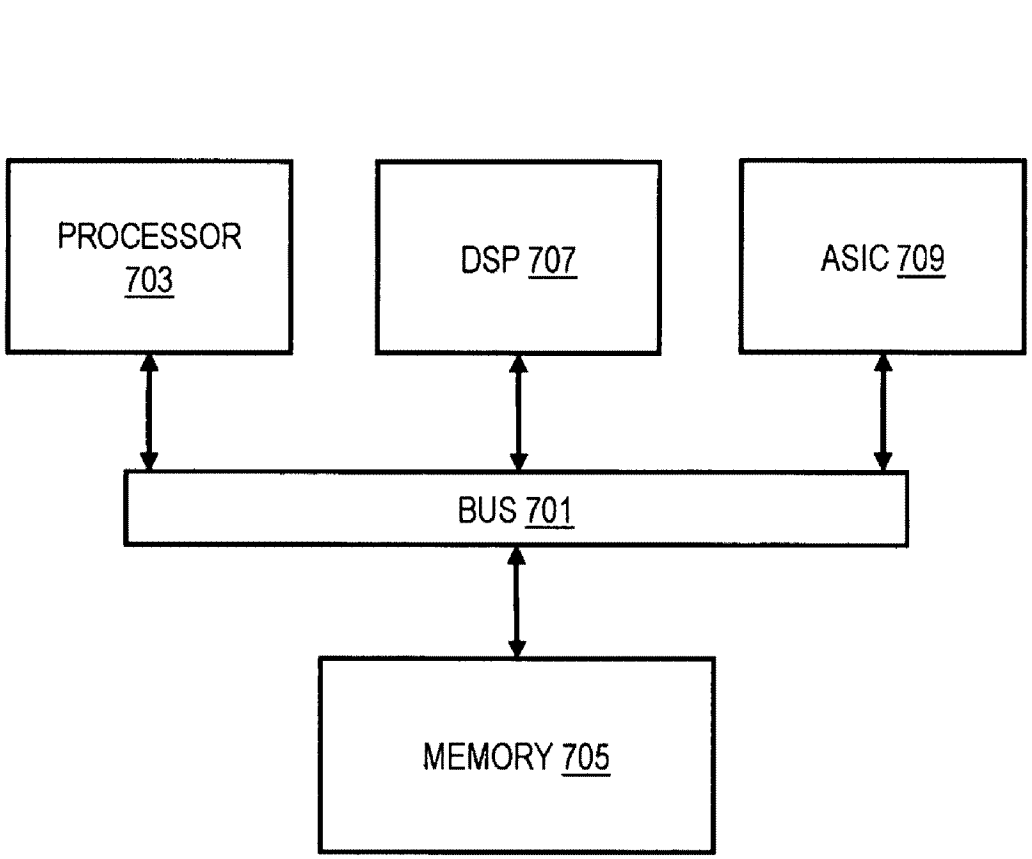
FIG. 7 is a diagram of a chip set that can be used to implement an embodiment of the invention.

FIG. 7 illustrates a chip set 700 upon which an embodiment of the invention may be implemented. Chip set 700 is programmed to carry out the inventive functions described herein and includes, for instance, the processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-word signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein. The memory 705 also stores the data associated with or generated by the execution of the inventive steps.

Figure 8:
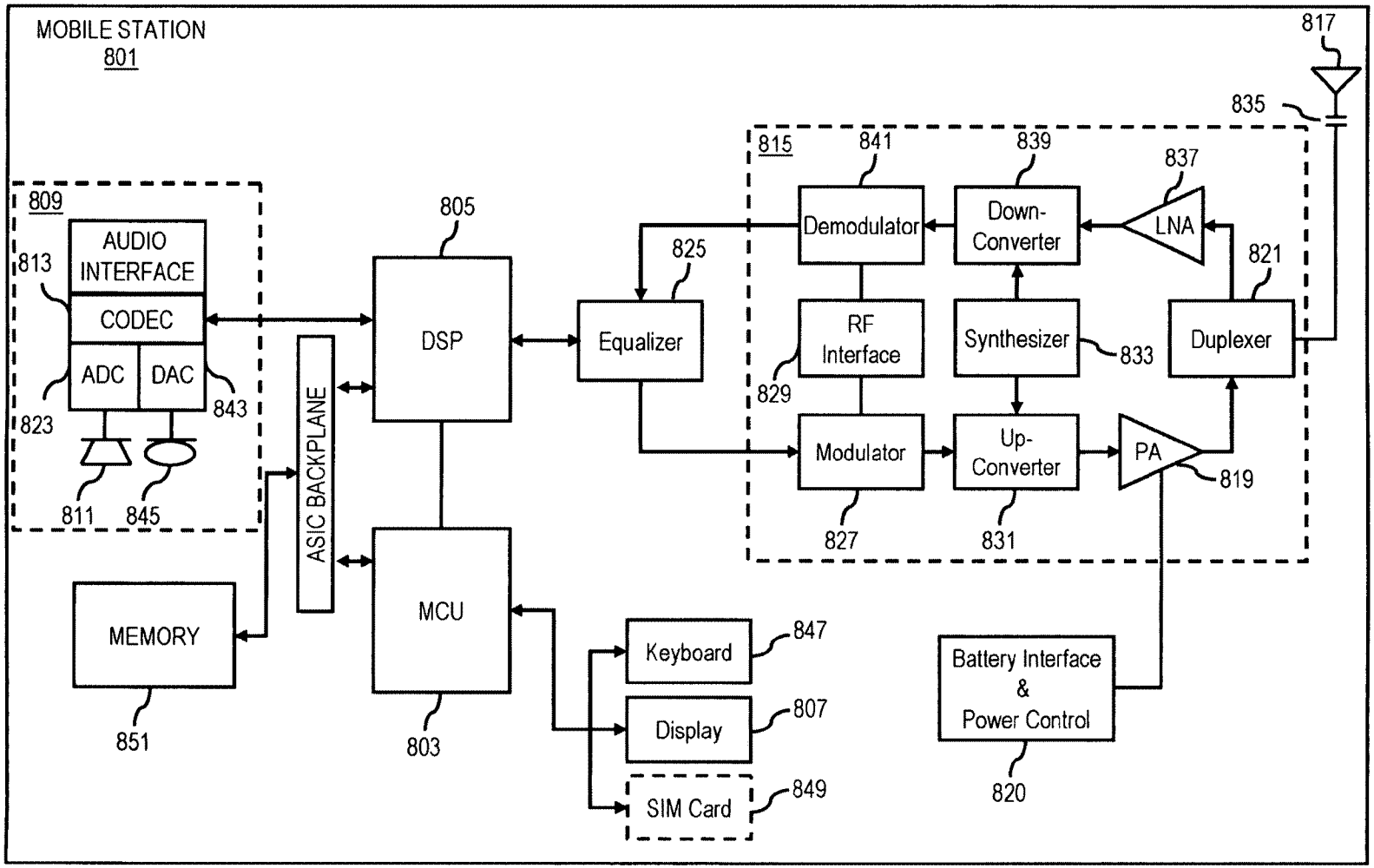
FIG. 8 is a diagram of a terminal that can be used to implement an embodiment of the invention.

FIG. 8 is a diagram of example components of a mobile station (e.g., handset) capable of operating in the system of FIG. 1A, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the station include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile station functions. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile station 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In the example embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The MCU 803 delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the station. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile station 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile station 801 on a radio network. The card 849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method [for merging a plurality of information spaces in an information system,] comprising:

retrieving [the] *one or more* information spaces that are represented[, respectively,] by [a plurality of graphs, the information spaces having a plurality of subscribed agents] *one or more graphs, wherein the one or more graphs are a model of information implemented in web resources*;

receiving [a] *at least one* request to [merge the information spaces into a new information space] *generate one or more new information spaces represented by one or more new graphs based, at least in part, on the one or more information spaces*;

[determining to unify histories of the information spaces for the new information space, the histories relating to interactions, transitions, or a combination thereof of the information spaces with one another;]

[when an information space of the information spaces is determined to have a portion of history about other information spaces of the information spaces, removing the history portion that the information space has about the other information spaces;]

*determining one or more broken links of the one or more graphs;*

*identifying one or more nodes of the one or more graphs that are to be grounded;*

*grounding the one or more graphs based, at least in part, on the one or more nodes;*

*removing one or more portions from at least one history associated with the one or more graphs that are also included in at least one other history associated with the one or more graphs;* retrieving *one or more* rules corresponding to the *one or more* information spaces; *and* generating [a resultant set of rules] *one or more new rules* for the *one or more* new information [space] *spaces* based, *at least in part,* on resolving inconsistencies of the [retrieved] *one or more* rules[; and determining to update subscription information for the respective agents and the new information space].

2. A method of claim 1, *wherein the at least one request comprises at least one merge request to merge the one or more information spaces, the method* further comprising:

unifying the [agents for subscription to the new information space] *one or more graphs and one or more histories associated with the one or more graphs to create a new graph.*

3. A method of claim [1] *2, wherein the one or more information spaces are subscribed by a plurality of agents,* further comprising:

[updating subscription lists of the respective agents] *unifying the plurality of agents for subscription to the one or more new information spaces.*

4. A method of claim [1] *3*, further comprising:

updating *one or more subscription* lists of the [subscribed] *plurality of* agents [for the new information space].

5. A method of claim [1] *3*, further comprising:

[determining priority of the rules, based on heuristics, for the generation of the resultant set of rules] *updating one or more lists of the subscribed agents for the one or more new information spaces.*

6. An apparatus comprising:

at least one processor; and at least one memory including computer program code *for one or more programs,* the at least one memory and the computer program code configured to, with the at least one processor, cause the apparatus to perform at least the following[.]*;* retrieve [a plurality of] *one or more* information spaces [of an information system] that are represented[, respectively,] by [a plurality of] *one or more* graphs [for the new information space, the information spaces having a plurality of subscribed agents], *wherein the one or more graphs are a model of information implemented in web resources*;

receive [a] *at least one* request to [merge the information spaces into a new information space] *generate one or more new information spaces represented by one or more new graphs based, at least in part, on the one or more information spaces*[.]*;*

[determine to unify histories of the information spaces for the new information space, the histories relating to interactions, transitions, or a combination thereof of the information spaces with one another,]

[when an information space of the information spaces is determined to have a portion of history about other information spaces of the information spaces, remove the history portion that the information space has about the other information spaces,]

*determine one or more broken links of the one or more graphs;* identifying one or more nodes of the one or more graphs that are to be grounded;

ground the one or more graphs based, at least in part, on the one or more nodes;

remove one or more portions from at least one history associated with the one or more graphs that are also included in at least one other history associated with the one or more graphs[.]*;* retrieve *one or more* rules corresponding to the *one or more* information spaces, *and* generate [a resultant set of] *one or more new* rules for the *one or more* new information [space] *spaces* based, *at least in part,* on resolving inconsistencies of the [retrieved] *one or more* rules[, and determine to update subscription information for the respective agents and the new information space].

7. An apparatus of claim 6, wherein *the at least one request comprises at least one merge request to merge the one or more information spaces,* the apparatus is further caused, *at least in part,* to:

unify [the agents for subscription to the new information space] *the one or more graphs and one or more histories associated with the one or more graphs to create a new graph.*

8. An apparatus of claim [6] *7*, wherein *the one or more information spaces are subscribed by a plurality of agents,* the apparatus is further caused, *at least in part,* to:

[update subscription lists of the respective agents] *unify the plurality of agents for subscription to the one or more new information spaces.*

9. An apparatus of claim [6] *8*, wherein the apparatus is further caused, *at least in part,* to:

update *one or more subscription* lists of the [subscribed] *plurality of* agents [for the new information space].

10. An apparatus of claim [6] *8*, wherein the apparatus is further caused, *at least in part,* to:

[determine priority of the rules, based on heuristics, for the generation of the resultant set of rules] *update one or more lists of the subscribed agents for the one or more new information spaces.*

11. [A method of claim 1, wherein the portions of histories that each of the information spaces holds about the other ones of the information spaces are removed from the respective histories before the histories are unified] *An apparatus of claim 6, wherein the apparatus is further caused, at least in part, to:*

*determine priority of the one or more rules, based on heuristics, for the generation of the one or more new rules.*

*12. A method of claim 1, further comprising:*

*determining priority of the one or more rules, based on heuristics, for the generation of the one or more new rules.*

*13. A method of claim 1, wherein the at least one request comprises at least one split request to split the one or more information spaces, further comprising:*

*defining at least a first boundary for at least a first new information space and at least a second boundary for at least a second new information space; and*

*updating one or more histories of the first new information space and the second new information space based, at least in part, on at least the first boundary and the second boundary.*

*14. A method of claim 13, wherein the one or more new information spaces are subscribed by a plurality of agents, the method further comprising:*

*determining which of the plurality of agents are to be subscribed to which of the one or more new information spaces.*

*15. A method of claim 14, further comprising:*

*updating one or more subscription lists of the plurality of agents.*

*16. A method of claim 14, further comprising:*

*updating one or more lists of the plurality of agents for the one or more new information spaces.*

*17. A method of claim 14, further comprising:*

*receiving at least one query from at least one agent subscribed to at least a first new information space; and*

*generating at least one response specifying at least one answer found in the first new information space or indicating that the at least one answer may exist in at least a second new information space.*

*18. An apparatus of claim 6, wherein the at least one request comprises at least one split request to split the one or more information spaces, the apparatus is further caused, at least in part, to:*

*define at least a first boundary for at least a first new information space and at least a second boundary for at least a second new information space; and*

*update one or more histories of the first new information space and the second new information space based, at least in part, on at least the first boundary and the second boundary.*

*19. An apparatus of claim 18, wherein the one or more new information spaces are subscribed by a plurality of agents, the apparatus is further caused, at least in part, to:*

*determine which of the plurality of agents are to be subscribed to which of the one or more new information spaces.*

*20. An apparatus of claim 19, the apparatus is further caused, at least in part, to: update one or more subscription lists of the plurality of agents.*

*21. An apparatus of claim 19, the apparatus is further caused, at least in part, to: update one or more lists of the plurality of agents for the one or more new information spaces.*

*22. An apparatus of claim 19, the apparatus is further caused, at least in part, to:*

*receive at least one query from at least one agent subscribed to at least a first new information space; and*

*generate at least one response specifying at least one answer found in the first new information space or indicating that the at least one answer may exist in at least a second new information space.*

* * * * *